US012469352B2

(12) United States Patent
David et al.

(10) Patent No.: US 12,469,352 B2
(45) Date of Patent: Nov. 11, 2025

(54) FUNCTIONALITY OF A DISPENSING MACHINE THAT IS IN COMMUNICATION WITH A WIRELESS NETWORK

(71) Applicant: Trinity Axis Inc., Harleysville, PA (US)

(72) Inventors: Jeremiah Divyan David, Tamil Nadu (IN); David D. Davidar, Schwenksville, PA (US)

(73) Assignee: Trinity Axis Inc., Harleysville, PA (US)

( * ) Notice: Subject to any disclaimer, the term of this patent is extended or adjusted under 35 U.S.C. 154(b) by 0 days.

(21) Appl. No.: 18/108,073

(22) Filed: Feb. 10, 2023

(65) Prior Publication Data

US 2024/0273963 A1   Aug. 15, 2024

(51) Int. Cl.
*G07F 9/00*        (2006.01)
*G06Q 10/087*      (2023.01)
*G06Q 30/0251*     (2023.01)

(52) U.S. Cl.
CPC .......... *G07F 9/002* (2020.05); *G06Q 10/087* (2013.01); *G06Q 30/0267* (2013.01)

(58) Field of Classification Search
CPC ... G07F 9/002; G06Q 10/087; G06Q 30/0267
See application file for complete search history.

(56) References Cited

U.S. PATENT DOCUMENTS

| | | |
|---|---|---|
| 4,412,292 A | 10/1983 | Sedam et al. |
| 4,778,983 A | 10/1988 | Ushikubo |
| 5,491,326 A | 2/1996 | Marceau et al. |
| 6,564,121 B1 | 5/2003 | Wallace et al. |
| 6,721,578 B2 | 4/2004 | Minear et al. |
| 6,839,775 B1 | 1/2005 | Kao et al. |
| 6,920,372 B2 | 7/2005 | Nickerson et al. |
| 7,072,855 B1 | 7/2006 | Godlewski et al. |
| 7,289,880 B2 | 10/2007 | Baack et al. |
| 7,325,728 B2* | 2/2008 | Arora ................. G07F 9/026 235/383 |
| 7,455,223 B1 | 11/2008 | Wilson et al. |

(Continued)

OTHER PUBLICATIONS

X. Lu, S. Chen, C. Wu and M. Li, "The Pulse Width Modulation and its Use in Induction Motor Speed Control," 2011 Fourth International Symposium on Computational Intelligence and Design, Hangzhou, China, 2011, pp. 195-198 (Year: 2011).*

(Continued)

*Primary Examiner* — Matthew L Hamilton
(74) *Attorney, Agent, or Firm* — C. Tumey Law Group PLLC

(57) ABSTRACT

Systems and methods of the present disclosure relate to functionality of a dispensing machine (e.g., a vending apparatus) that is in communication with a wireless network. A system includes the wireless network, a messaging server in communication with the wireless network, a host application server in communication with the wireless network, a client application in communication with the wireless network, and a dispensing machine in communication with the wireless network. The dispensing machine is configured to transmit logs to the wireless network. The dispensing machine is also configured to receive updates from the host application server.

17 Claims, 11 Drawing Sheets

(56) References Cited

U.S. PATENT DOCUMENTS

| | | | |
|---|---|---|---|
| 7,460,130 B2 * | 12/2008 | Salganicoff | A61B 5/1495 345/590 |
| 7,515,989 B2 | 4/2009 | Yoshizaki | |
| 7,574,654 B2 | 8/2009 | Motoyama et al. | |
| 7,783,508 B2 | 8/2010 | Murray et al. | |
| 7,841,514 B2 | 11/2010 | Mueller et al. | |
| 7,881,822 B2 | 2/2011 | Thornton et al. | |
| 7,895,076 B2 | 2/2011 | Kutaragi et al. | |
| 8,117,067 B2 | 2/2012 | Ketchum | |
| 8,145,546 B2 | 3/2012 | Coveley et al. | |
| 8,251,196 B2 | 8/2012 | Dietz et al. | |
| 8,386,074 B2 | 2/2013 | Smith, III et al. | |
| 8,521,604 B2 | 8/2013 | Seki et al. | |
| 8,521,605 B2 | 8/2013 | Seki et al. | |
| 8,682,350 B2 | 3/2014 | Altman et al. | |
| 8,760,296 B2 | 6/2014 | Martin | |
| 8,788,341 B1 | 7/2014 | Patel et al. | |
| 8,972,048 B2 | 3/2015 | Canora et al. | |
| 8,978,867 B2 | 3/2015 | Kim | |
| 8,990,868 B2 | 3/2015 | Lee et al. | |
| 8,998,082 B2 | 4/2015 | Illingworth et al. | |
| 9,218,703 B2 | 12/2015 | Insolia et al. | |
| 9,245,157 B1 | 1/2016 | Cipriano | |
| 9,292,993 B2 | 3/2016 | Canter et al. | |
| 9,333,646 B2 | 5/2016 | Boyer et al. | |
| 9,589,412 B2 | 3/2017 | Shimmerlik et al. | |
| 9,645,561 B2 | 5/2017 | Borke et al. | |
| 9,685,034 B2 | 6/2017 | Weber et al. | |
| 9,972,158 B2 | 5/2018 | Schtein et al. | |
| 10,235,652 B2 | 3/2019 | Varrasso | |
| 10,402,804 B1 | 9/2019 | Wittern, III et al. | |
| 10,445,672 B2 | 10/2019 | Renfroe | |
| 10,884,729 B2 | 1/2021 | Nailbero et al. | |
| 10,942,913 B1 | 3/2021 | Khoyilar et al. | |
| 11,011,009 B2 | 5/2021 | Felique | |
| 11,062,547 B2 | 7/2021 | Adelberg et al. | |
| 11,107,136 B2 | 8/2021 | Conville et al. | |
| 11,176,785 B1 * | 11/2021 | Wilson | G07F 19/209 |
| 11,804,111 B1 * | 10/2023 | Schott | G07F 19/206 |
| 2002/0075149 A1 * | 6/2002 | Goodwin, III | G07F 9/026 340/540 |
| 2002/0128932 A1 | 9/2002 | Yung et al. | |
| 2003/0028814 A1 | 2/2003 | Carta et al. | |
| 2003/0125836 A1 | 7/2003 | Chirnomas | |
| 2003/0139966 A1 | 7/2003 | Sirota et al. | |
| 2004/0068346 A1 | 4/2004 | Boucher | |
| 2004/0103027 A1 | 5/2004 | Yamamoto et al. | |
| 2004/0133466 A1 | 7/2004 | Redmond et al. | |
| 2005/0010500 A1 | 1/2005 | Coveley | |
| 2005/0043011 A1 | 2/2005 | Murray et al. | |
| 2005/0155060 A1 | 7/2005 | Sato et al. | |
| 2006/0219517 A1 * | 10/2006 | Cheng | G07F 9/026 194/217 |
| 2007/0241120 A1 | 10/2007 | Henry | |
| 2007/0250384 A1 | 10/2007 | Geller et al. | |
| 2008/0052148 A1 | 2/2008 | Walker et al. | |
| 2008/0116254 A1 * | 5/2008 | Sleeman | G07F 19/20 235/375 |
| 2010/0125362 A1 | 5/2010 | Canora et al. | |
| 2010/0138285 A1 | 6/2010 | Leonard et al. | |
| 2010/0203961 A1 * | 8/2010 | Burke | G07F 17/3232 463/29 |
| 2010/0235240 A1 | 9/2010 | Park et al. | |
| 2010/0268792 A1 | 10/2010 | Butler et al. | |
| 2011/0071668 A1 * | 3/2011 | Lin | G07F 9/026 700/231 |
| 2012/0310410 A1 | 12/2012 | Adams et al. | |
| 2012/0310656 A1 * | 12/2012 | Stache | G06Q 20/32 705/1.1 |
| 2012/0312658 A1 | 12/2012 | Coveley et al. | |
| 2013/0006416 A1 * | 1/2013 | Canter | G06Q 30/0241 700/236 |
| 2013/0013107 A1 * | 1/2013 | Felique | G07F 9/00 700/244 |
| 2013/0079926 A1 | 3/2013 | Peters et al. | |
| 2013/0144432 A1 | 6/2013 | Canter et al. | |
| 2013/0301884 A1 * | 11/2013 | Lyons | G07F 17/3237 235/382 |
| 2014/0040028 A1 | 2/2014 | King et al. | |
| 2014/0164624 A1 * | 6/2014 | Ames | G06F 9/45558 709/226 |
| 2014/0358705 A1 * | 12/2014 | Harrington | G06Q 30/0623 705/16 |
| 2015/0088675 A1 | 3/2015 | Varrasso | |
| 2015/0281302 A1 * | 10/2015 | Winston | H04L 67/02 709/219 |
| 2015/0339621 A1 | 11/2015 | Hewett et al. | |
| 2016/0117744 A1 | 4/2016 | Oayda et al. | |
| 2017/0228958 A1 * | 8/2017 | Shimmerlik | F16M 13/02 |
| 2017/0278336 A1 * | 9/2017 | Kan | G06Q 20/16 |
| 2017/0345245 A1 | 11/2017 | Torresani et al. | |
| 2018/0096554 A1 * | 4/2018 | Hough | G07F 9/026 |
| 2018/0137492 A1 | 5/2018 | Abu Hamam | |
| 2019/0034896 A1 | 1/2019 | Gaur et al. | |
| 2019/0156612 A1 | 5/2019 | Dobbins et al. | |
| 2019/0206174 A1 | 7/2019 | Miu et al. | |
| 2019/0244211 A1 | 8/2019 | Saunders et al. | |
| 2019/0251562 A1 | 8/2019 | Dabiri | |
| 2019/0385137 A1 | 12/2019 | Barragán et al. | |
| 2020/0098001 A1 | 3/2020 | Antala | |
| 2020/0390622 A1 * | 12/2020 | England | G07F 9/0235 |
| 2021/0216637 A1 | 7/2021 | Gao | |
| 2021/0279994 A1 | 9/2021 | Patel et al. | |
| 2021/0326948 A1 | 10/2021 | Shah | |
| 2021/0327201 A1 | 10/2021 | Patel | |
| 2021/0327203 A1 * | 10/2021 | Shah | G06F 21/32 |
| 2022/0079394 A1 | 3/2022 | Murphy et al. | |
| 2022/0164766 A1 | 5/2022 | Seol et al. | |
| 2022/0164828 A1 | 5/2022 | Hicken et al. | |
| 2022/0180689 A1 | 6/2022 | Kwon | |
| 2022/0366755 A1 | 11/2022 | Labartkava | |
| 2023/0174304 A1 * | 6/2023 | Edmonds | B65G 1/1371 700/231 |
| 2023/0259482 A1 * | 8/2023 | Simpkins | G06F 11/3062 710/106 |

OTHER PUBLICATIONS

International Search Report and Written Opinion for International Patent Application No. PCT/US 24/14236 dated Jul. 3, 2024. PDF file. 13 pages.

* cited by examiner

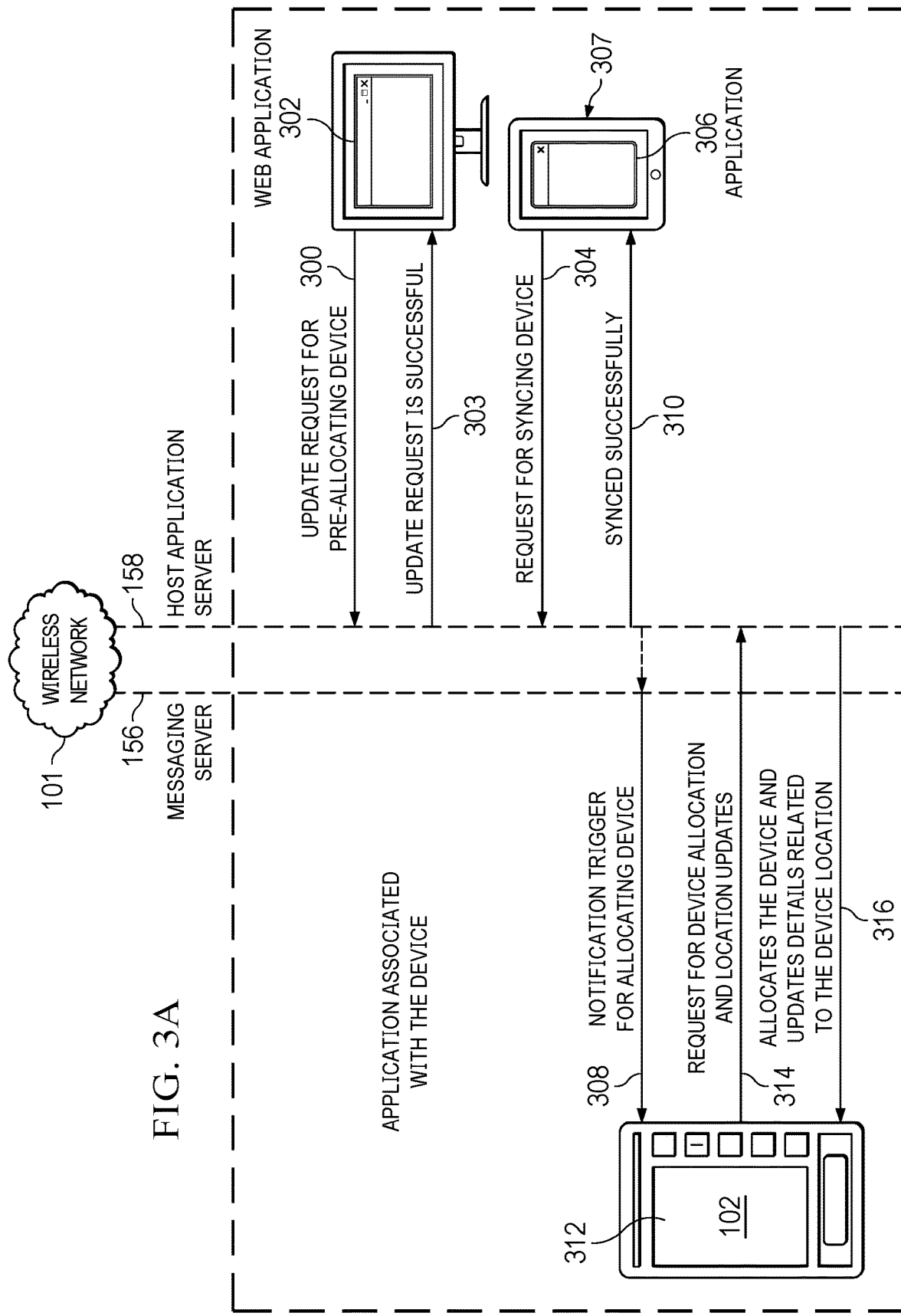

FUNCTIONALITY OF A DISPENSING MACHINE THAT IS IN COMMUNICATION WITH A WIRELESS NETWORK

BACKGROUND

Dispensing systems may include machines to dispense a variety of items, including beverages, food, and other consumer products. However, to update the data and inventory using these systems involves a technician to use buttons on the machine to make adjustments for inventory count, visual graphics on the machine, and prices of products. This may be inconvenient and time-consuming.

SUMMARY

Disclosed herein are exemplary systems and methods for functionality of a dispensing machine that is in communication with a wireless network. A system includes a wireless network; a messaging server in communication with the wireless network; a host application server in communication with the wireless network; a client application in communication with the wireless network; and a dispensing machine in communication with the wireless network, the dispensing machine configured to transmit logs to the wireless network.

Another system includes: a wireless network including a messaging server and a host application server; and a dispensing machine in communication with the wireless network, the dispensing machine including a dispensing mechanism and sensors, wherein the wireless network is configured to transmit preconfigured instructions to the dispensing machine, the preconfigured instructions including instructions for: communications with the messaging server, converting instruction data to signals, displaying a graphical user interface, the signals for operating the dispensing mechanism, reading signals from a sensor, camera and a reader, authorization of a user of the dispensing machine, and segregating and storing data, media files, and preference values.

A method includes transmitting an update request to sync and confirm a dispensing machine to a pre-allocated location; syncing and allocating the dispensing machine; transmitting an update request to update a planogram for the dispensing machine; updating the planogram for the dispensing machine; transmitting an update request to restock the dispensing machine; receiving inventory updates; transmitting an update request to schedule advertisements for display by the dispensing machine; updating an advertisement schedule for the dispensing machine; transmitting a request for adding reader data for access to the dispensing machine; updating the reader data; transmitting a request for updating a dispensing mode of the dispensing machine; updating dispensing mode; transmitting a request for updating the product verification mode; updating the product verification mode; and transmitting a request for updating sensor/reader configuration; updating sensor/reader configuration.

BRIEF DESCRIPTION OF THE DRAWINGS

These drawings illustrate certain aspects of some examples of the present disclosure and should not be used to limit or define the disclosure.

FIGS. 3A-3H illustrate communication between the network, at least one application associated with the dispensing machine, a web application, and a mobile application, in accordance with examples of the present disclosure.

DETAILED DESCRIPTION

Figure 1:
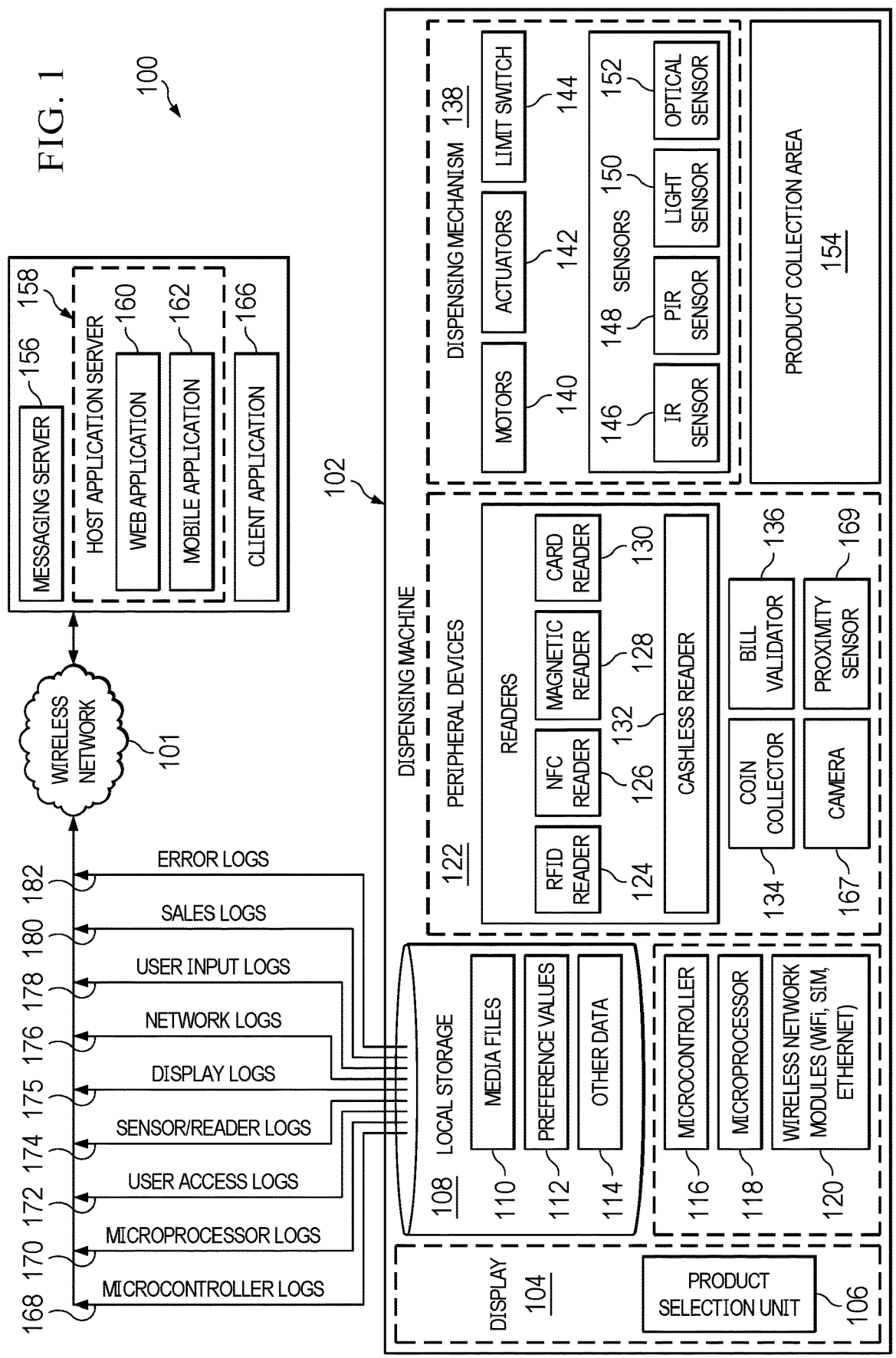
FIG. 1 illustrates a system for data communications between a wireless network and a dispensing machine, in accordance with examples of the present disclosure.

It is to be understood that the present disclosure is not limited to particular devices or methods, which may, of course, vary. It is also to be understood that the terminology used herein is for the purpose of describing particular embodiments only and is not intended to be limiting. All numbers and ranges disclosed herein may vary by some amount. Whenever a numerical range with a lower limit and an upper limit is disclosed, any number and any included range falling within the range are specifically disclosed. Although individual embodiments are discussed herein, the invention covers all combinations of all those embodiments. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. If there is any conflict in the usages of a word or term in this specification and one or more patent or other documents that may be incorporated herein by reference, the definitions that are consistent with this specification should be adopted for the purposes of understanding this invention.

The present disclosure relates to functionality of a dispensing machine (e.g., a vending apparatus) that is in communication with a wireless network. The dispensing machine includes an interface to collect user input; one or more processors connecting to the interface (processor may include at least one microprocessor or at least one microcontroller); microcontroller may perform operational activities but are not limited to: communication with the payment system to keep track of the inserted amount of credit, monitor button presses on the selection panel to check if the consumer selects an item, control motor relay in the dispensing machine to release a product through the dispenser unit, monitor sensor to check if product is sold-out/dispense, monitor temperature sensor and control temperature of items within the dispensing machine by means of the cooling system, onboard microcontroller peripherals, which include, but are not limited to: I/O ports for processing digital input and output signals, UART peripheral (Universal Asynchronous Receiver/Transmitter) to receive and transmit data over a serial line, A/D converter (analog-to-digital) to read sensors that produce analog signals, D/A converter (digital-to-analog) to output analog signals or voltage levels, I2C (Inter-Integrated Circuit) for Inter-IC communication between components which reside on the same circuit board, PWM (Pulse Width Modulation) to control motors, a dispensing mechanism; an arrangement to hold products to be dispensed; one or more applications running on the dispensing machine; one or more sensors, cameras, readers.

The wireless network includes one or more servers which are pre-configured for operation; and one or more applications which are used to monitor, update, and make changes to the dispensing machine; applications used for the monitoring may include any data communication or observations made at the dispensing machine sent to the wireless network such as: logs of microcontroller or microprocessor, logs of door access granted with the timestamp and users' details (e.g., RFID, Username, User type, User classification, User access level, User ID, User access count, User preferences, User profile details, User session); logs from sensors/readers with timestamp and event occurrences by sensors/readers in the dispensing machine; logs of dispensing machine display (e.g., display idle state, standby details, screen saver details, advertisement display time and advertisement error state, blank display) and network status (e.g., mode of connections, network provider name, total data consumed per dispense, data consumed per day, data consumption report, downtime/uptime, connectivity via sim, connectivity via Wi-Fi, alteration between sim and Wi-Fi, bandwidth strength); input provided by users on dispensing items from the dispensing machine (e.g., input may include selection of products, scrolling of images, adding product to cart, modifying quantity, checkout count, purchase of products, selection of payment mode, rating of service or products, feedback, raising requests, raising tickets, change of language, change of currency, category selection, change of theme, change of brightness setting, change of volume level); sales log (e.g., vend log, daily summary, weekly analysis log, amount of goods, the remaining amount of change, sales volume and sales data) with details of items dispensed from the dispensing machine including dispensing mechanism data, sensor data and transaction data (e.g., transaction data includes product categorization code, product identification number, product quantities, transaction time and date, mode of payment, machine ID, location of transaction); and/or error reports which may include dispense failure, component failure, the failure code, monitor code, breakdown code, malfunctions, service technician required and other reports which indicate that troubleshooting is required. The troubleshooting may be performed physically by a technician at the dispensing machine. The troubleshooting may also be performed remotely by sharing data to the dispensing machine controller via wireless network through push notification method; sharing data to the dispensing machine controller via wireless network through API call; connecting via to the dispensing machine via wireless network through an application; accessing data from the dispensing machine via wireless network.

The update may include any communication of processes, configurations, software, firmware and/or instructions from the wireless network to the dispensing machine. The processes may be stored on one or more microcontrollers or microprocessors. These processes may utilize local storage or internal memory for storing data, instructions, logs, and/or events. In some cases, software/firmware update is done where specific data is removed to save the internal memory of the dispensing machine. In some cases, cache data/irrelevant data are removed periodically from internal memory of the microprocessor/controller.

The communication of processes, configurations, and/or instructions includes: preconfigured pulses which are to be stored in one or more processors in the dispensing machine to operate at least one motor of a dispensing mechanism; preconfigured instructions to one or more processors of a dispensing machine to read signals from a sensor (e.g., sensors may include limit switches, IR sensors, PIR sensors, proximity sensors, light sensors and other optical sensors); preconfigured instructions to one or more processors of a dispensing machine to read signals from a reader (e.g., readers may include RFID reader, NFC reader, magnetic readers, QR reader, barcode reader, optical code reader, smart card reader, optical character recognition reader (OCR reader)); preconfigured instructions to one or more processors of a dispensing machine to read signals from a camera (e.g., camera may include HD cameras, embedded cameras, thermal cameras, infrared camera sensors, image capture systems); preconfigured instructions to read a user's input on the dispensing machine, and qualify the user for dispensing products from the dispensing machine (e.g., the qualifying instructions include communication with the wireless network to authorize the said user and to authorize the user's input); preconfigured instructions to segregate and store frequently used data, media files and shared preference values locally in the dispensing machine; preconfigured instructions on the dispensing machine to communicate with the messaging server on the wireless network; preconfigured instructions for the graphical user interface on the dispensing machine; preconfigured instructions to be able to send instruction data from a microprocessor in a single form, or in multiple parts to one or more microcontrollers for operating a dispensing mechanism; and preconfigured instructions to the microcontroller to convert instruction data to pulses (e.g., signals, range, current) for operating a dispensing mechanism.

The changes may include communicating data from the wireless network to the dispensing machine such as: sending instruction data from the wireless network to the dispensing machine (e.g., the instruction data includes data for operating a dispensing mechanism to dispense at least one product); updating the notification at the dispensing machine on receiving signals from the messaging server; updating the planogram/arrangement of items with item information in compartments/layouts within a dispensing machine; updating the price of at least one product within a dispensing machine; updating the product information on a dispensing machine (e.g., manufacturing date, packaging ID, batch numbers, brand name, product name, product description details, product ID, product type, product image ID, product images, product dimensions, product weight, product shape, product expiry date, product contents, product ingredients, nutritional facts, allergen details, product quantity, and internal structure info including internal structure ID, name and image, product structure allocation ID, dimensions and product coordinates ID with position values in the dispensing machine); updating the discounts of at least on product on the dispensing machine (e.g., reduced price, discount percentage, discount value, difference amount; updating the advertisement ID, start date and time of advertisement, end date and time of advertisement, no of looping, advertisement timeline ID with media details including media ID, media type, images, videos, optical code with downloadable features, optical code with URL links, optical code with coupons, reward points, earned points, promotional marking, voucher, rebate amount optical code with promotion codes and media URLs, other data on a dispensing machine linked to an advertisement campaign on the dispensing machine; updating authorized personnel details (e.g., access card data, access type, access card holder name, card number, unique key ID, access level, RFID, hardware unique number) on the dispensing machine; updating operational access to the dispensing machine which may include unlocking of door, access to at least one product, energizing/de-energizing internal component of dispensing machine; updating the inventory (e.g., count of a product, track of the inventory of products, a record of offers outputted by the vending machine on the dispensing machine which may also include update of item information); updating the mode for dispensing at least one item from the dispensing machine (e.g., mode of cash payment, credit system, debit system, user groups, prepaid modes, age restrictions, product restrictions, quantity restriction, allowance restrictions, product size restrictions); and updating the product verification mode for scanning or verifying at least one item from the dispensing machine.

FIG. 1 illustrates a system 100 for data communications between a wireless network (network 101) and a dispensing machine 102, in accordance with examples of the present disclosure. The dispensing machine 102 may include a display 104; a product selection unit 106 (e.g., touch screen, button, voice assistant system, gesture control, joystick, keypad, mouse); local storage 108 that includes media files 110, preference values 112, and other data 114; a microcontroller 116; a microprocessor 118; a wireless network module 120 (e.g., Wi-Fi, SIM, ethernet); The dispensing machine 102 may be connected to a local area network (LAN), wireless area network (WAN) and/or the internet through one or more network modules; peripheral devices 122 that include an RFID reader 124, an NFC reader 126, a magnetic reader 128, a card reader 130, and/or a cashless reader 132; a coin collector 134; bill validator 136; a camera 167 (e.g., camera may include HD cameras, embedded cameras, thermal cameras, infrared camera sensors, image capture systems), a proximity sensor 169 and a dispensing mechanism 138 that includes motors 140, actuators 142, a limit switch 144, an IR sensor 146, a PIR sensor 148, a light sensor 150, an optical sensor 152, and a product collection area 154.

The network 101 is in communication with messaging server 156; host application server 158 that includes at least one web application 160, at least one mobile application 162; and at least one client application 166. The dispensing machine 102 is configured to transmit microcontroller logs 168 (e.g., control and/or monitor status information, configuration data, one or more events, and/or one or more activities, in the dispensing machine); microprocessor logs 170; user access logs 172 (e.g., RFID, Username, User type, User classification, User access level, User ID, User access count, User preferences, User profile details, User session); sensor/reader logs 174; display 175 (e.g., display idle state, standby details, screen saver details, advertisement display time and advertisement error state, blank display) and network logs 176 (e.g., mode of connections, network provider name, total data consumed per dispense, data consumed per day, data consumption report, downtime/uptime, connectivity via sim, connectivity via Wi-Fi, alteration between sim and Wi-Fi, bandwidth strength); user input logs 178 (e.g., input may include selection of products, input coupon code, claiming voucher, redeeming points, game of skill operable on the touch screen of an electronic device, scrolling of images, adding product to cart, modifying quantity, checkout count, purchase of products, selection of payment mode, rating of service or products, feedback, raising requests, raising tickets, change of language, change of currency, category selection, change of theme, change of brightness setting, change of volume level); sales logs 180 (e.g., vend log, daily summary, weekly analysis log, amount of goods, the remaining amount of change, sales volume and sales data); and error logs 182 (dispense failure, component failure, malfunctions service technician required and other reports. The logs are transmitted to the network 101.

Figure 2:
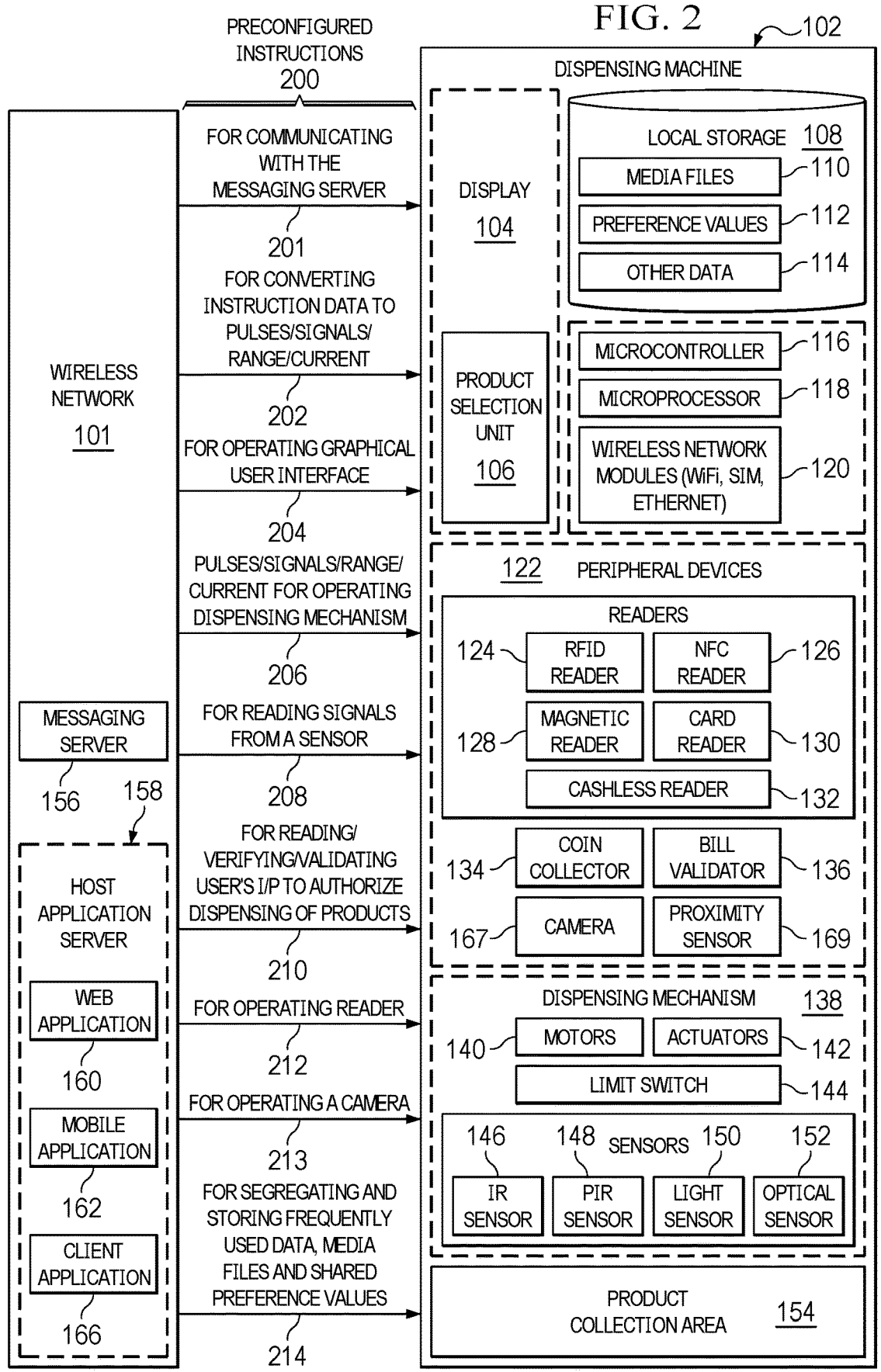
FIG. 2 illustrates the network transmitting preconfigured instructions to the dispensing machine, in accordance with examples of the present disclosure.

FIG. 2 illustrates the network 101 transmitting preconfigured instructions to the dispensing machine 102, in accordance with examples of the present disclosure. The network 101 including the messaging server 156 and the host application server 158 transmit preconfigured instructions to the dispensing machine 102. The preconfigured instructions 200 include: instruction 201 for communicating with the messaging server 156; instruction 202 for converting instruction data to pulses/signals/range/current in single form or in multiple parts for operating the dispensing mechanism 138; instruction 204 for operating the GUI (display 104); instruction 206 for the pulses/signals/range/current for operating the dispensing mechanism 138; instruction 208 for reading signals from a sensor (e.g., an IR sensor 146, a PIR sensor 148, a light sensor 150, an optical sensor 152, a proximity sensor 169); instruction 210 for reading/verifying/validating user's credentials to authorize dispensing of products and/or to operate dispensing machine; instruction 212 for operating reader (e.g., the RFID reader 124, the NFC reader 126, the magnetic reader 128, the card reader 130); instruction 213 for operating a camera 167 (e.g., camera may include HD cameras, embedded cameras, thermal cameras, infrared camera sensors and image capture systems); and instruction 214 for segregating and storing frequently used data, media files, and shared preference values.

FIG. 3A illustrate communication between network 101, an application associated with the dispensing machine, a web application (e.g., running on a server), and an application (e.g., mobile application, web application), in accordance with examples of the present disclosure. At step 300, a web application 302 sends an update request to the host application server 158, for pre-allocating a device (e.g., dispensing machine, hardware asset, IOT device, conversion kit, payment reader, mobile device, smartphone). At step 303, the update request is successful, and confirmation of the successful request is sent to the application 306. At step 304, an application 306 (running on a mobile device or browser 307) sends a request to the host application server 158, for syncing the dispensing machine 102 to a location; the request may be sent via user input, pre-planned programmatic instructions, remote control of device, from server. At step 310, the dispensing machine 102 is successfully synced with the messaging server 156. At step 308, the messaging server 156 sends a notification trigger to an application 312 associated with the dispensing machine for allocating the dispensing machine 102. At step 314, a request for dispensing machine allocation and location updates is sent to the host application server 158. At step 316, the host application server 158 allocates the dispensing machine 102 and update details related to the dispensing machine location.

Figure 3B:
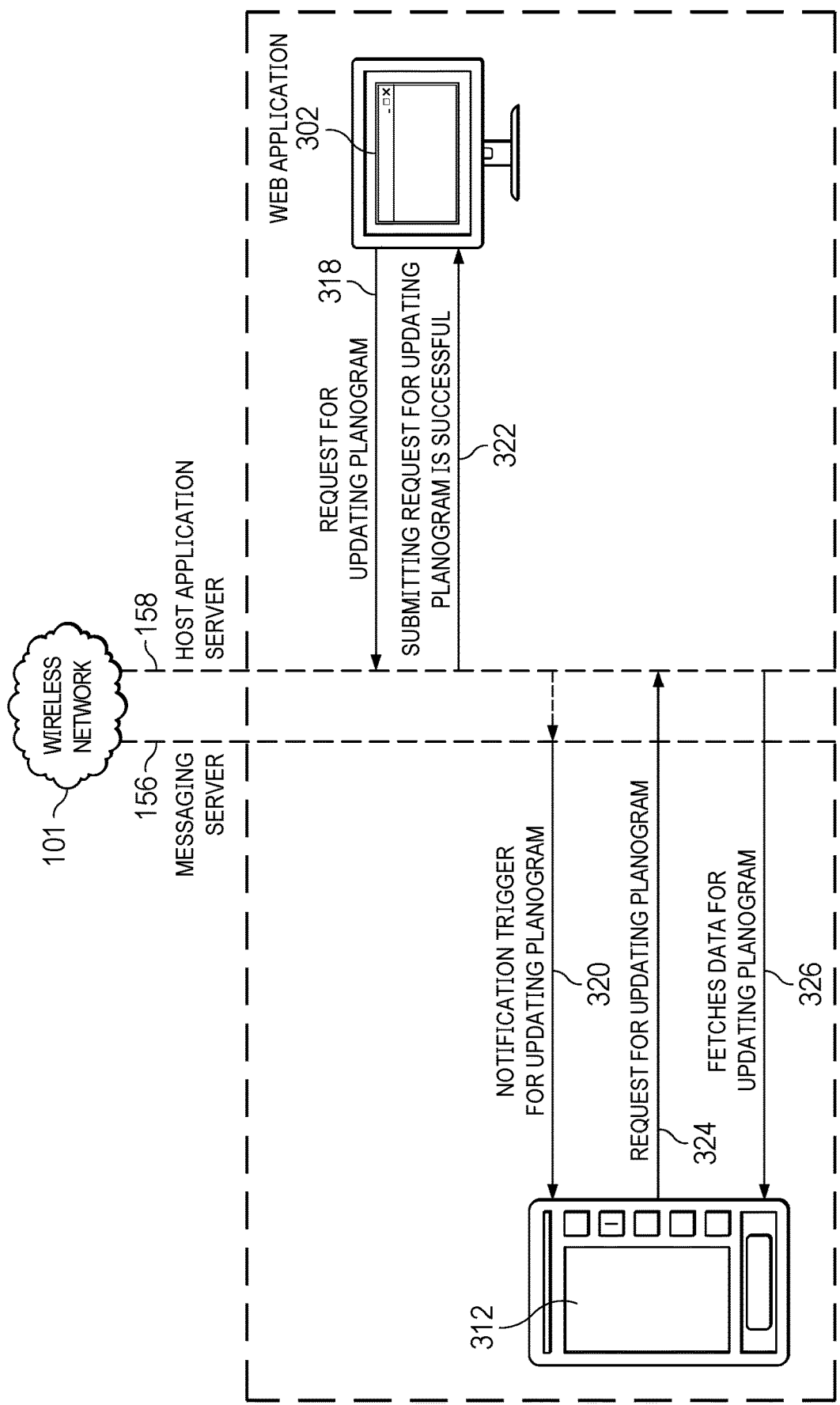

FIG. 3B illustrates communication between network 101, an application associated with the dispensing machine, a web application (e.g., running on a server), in accordance with examples of the present discloser. At step 318, a request for updating a planogram is sent from the web application 302 to the host application server 158. At step 322, the update request of step 318 is successful. At step 320, a notification trigger is sent from the messaging server 156 to update the planogram, to the application 312. At step 324, a request for updating the planogram is sent to the host application server 158 from the application 312. At step 326, the application 312 fetches data from the host application server 158 for updating the planogram.

Figure 3C:
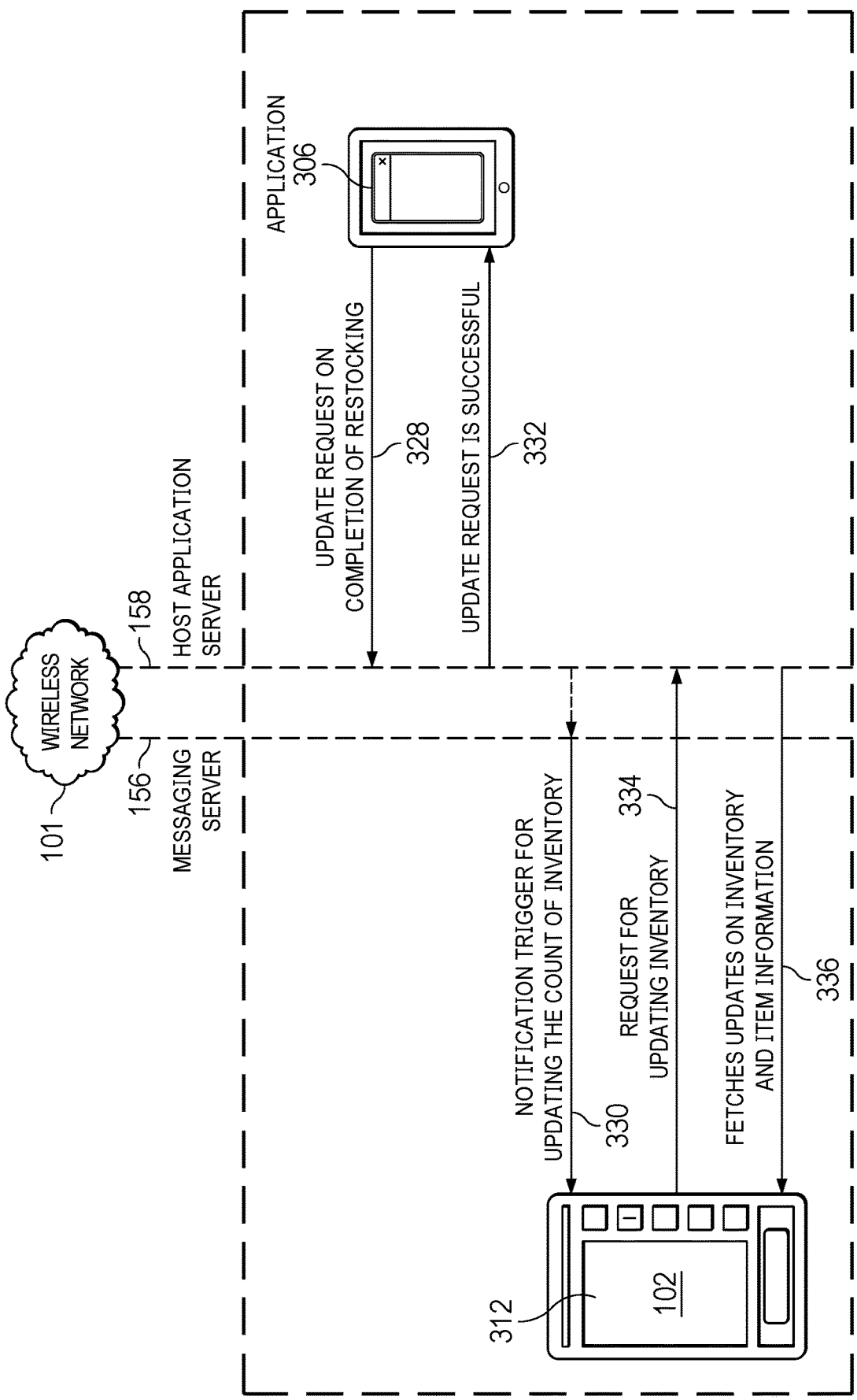

FIG. 3C illustrates communication between network 101, an application associated with the dispensing machine, a mobile application (e.g., running on a mobile device or browser), in accordance with examples of the present discloser. At step 328, the mobile application 306 sends an update request on completion of restocking items in the dispensing machine 102, to the host application server 158.

At step 332, the update request of step 328 is successful. At step 330, a notification trigger for updating the inventory is sent from the messaging server 156 to the application 312. At step 334, a request for updating inventory is sent from the application 312 to the host application server 158. At step 336, the application 312 fetches updates for inventory and item information from the host application server 158.

Figure 3D:
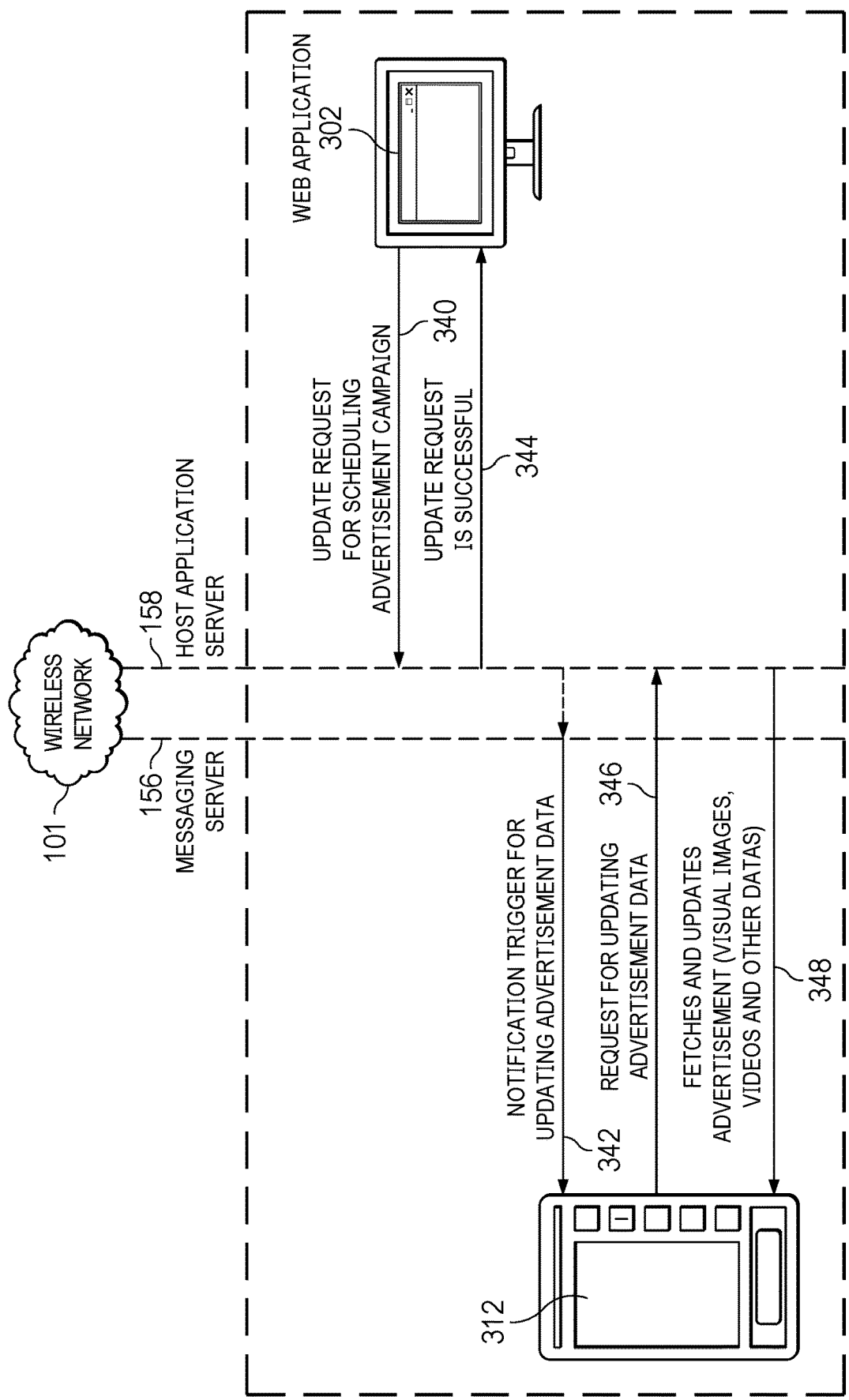

FIG. 3D illustrates communication between network 101, an application associated with the dispensing machine, a web application (e.g., running on a server), in accordance with examples of the present discloser. At step 340, an update request for scheduling an advertisement campaign is sent to the host application server 158 from the web application 302. At step 344, the update request of step 340 is successful. At step 342, the messaging server 156 sends a notification trigger for updating advertisement data, to the application 312. At step 346, a request for updating advertisement data is sent to the host application server 158.

At step 348, the application 312 fetches and updates advertisement (e.g., advertisement ID, start date and time of advertisement, end date and time of advertisement, no of looping, advertisement timeline ID with media details including media ID, media type, images, videos, optical code with downloadable features, optical code with URL links, optical code with coupons, optical code with promotion codes, reward points, earned points, promotional marking, voucher, rebate amount and media URLs and other data on a dispensing machine linked to an advertisement campaign on the dispensing machine), from the host application server 158.

Figure 3E:
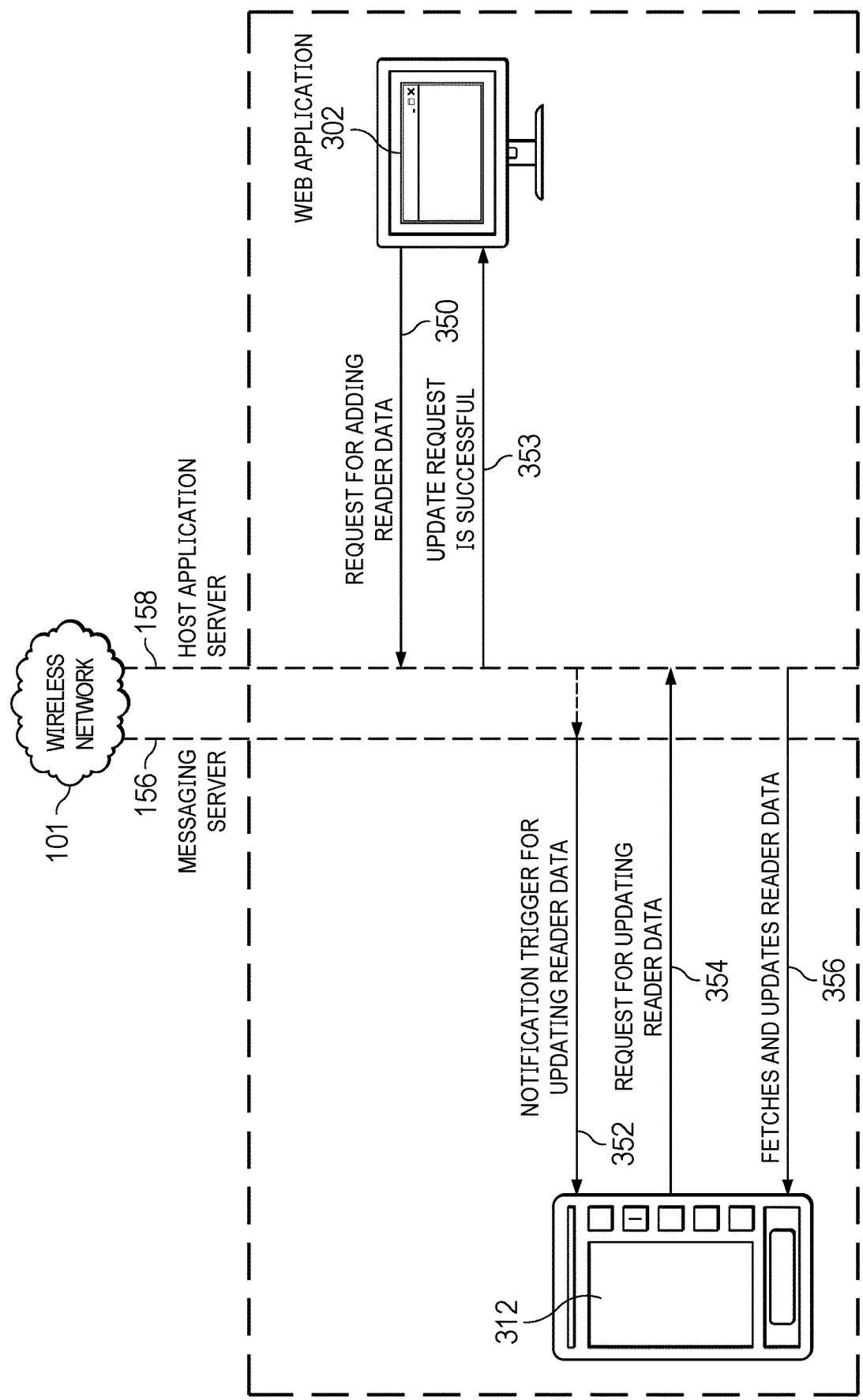

FIG. 3E illustrates communication between network 101, an application associated with the dispensing machine, a web application (e.g., running on a server), in accordance with examples of the present discloser. At step 350, a request for adding reader data is sent from the web application 302 to the host application server 158. At step 353, the update request of step 350 is successful. At step 352, a notification trigger for updating reader data is sent from the messaging server 156 to the application 312. At step 354, the application 312 sends a request for updating reader data, to the host application server 158. At step 356, the application 312 fetches and updates reader data (e.g., access card data, access type, access card holder name, card number, unique key ID, access level, RFID, hardware unique number) on the dispensing machine; updates operational access to the dispensing machine which may include unlocking of door, access to at least one product, energizing/de-energizing internal component of dispensing machine, from the host application server 158.

Figure 3F:
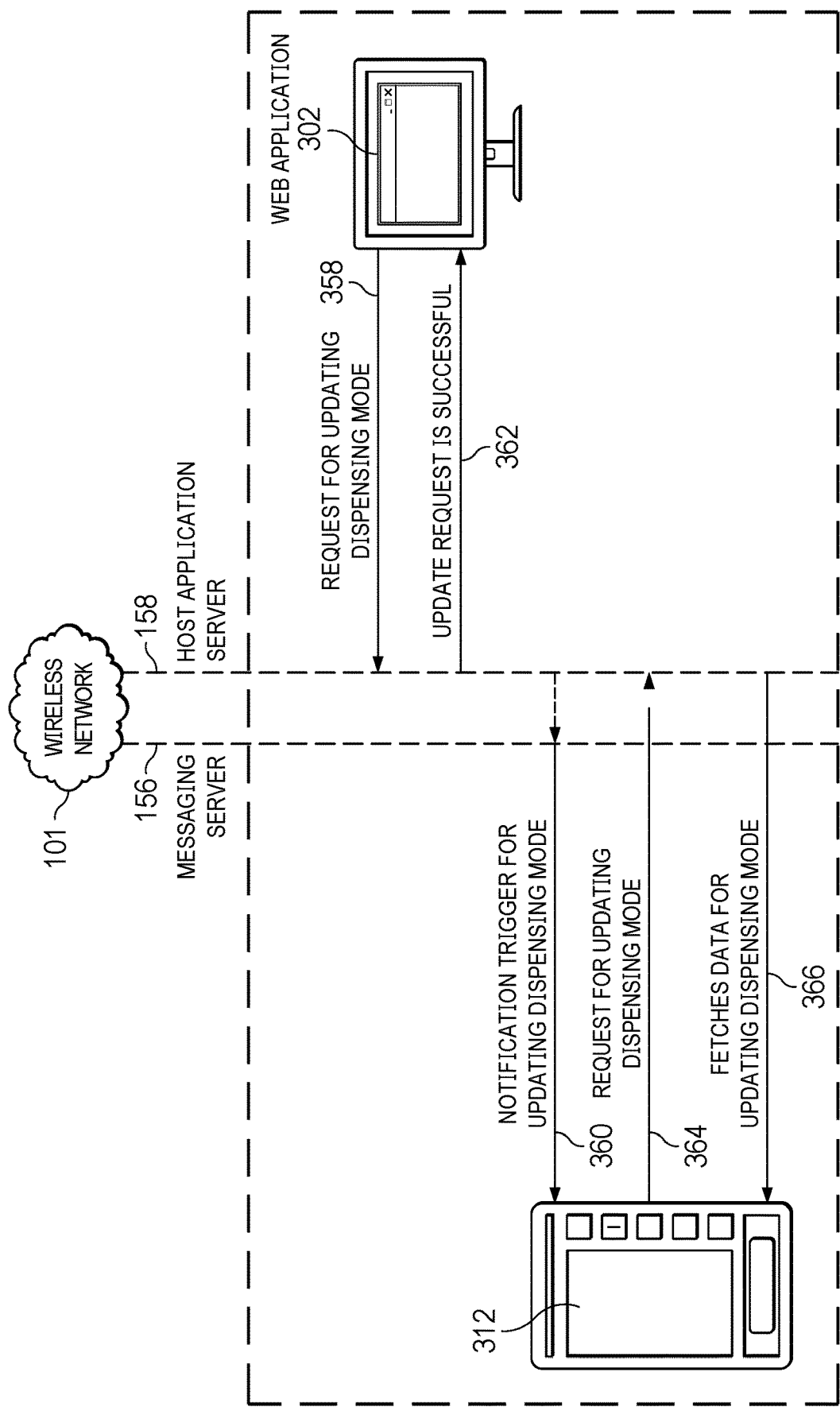

FIG. 3F illustrates communication between network 101, an application associated with the dispensing machine, a web application (e.g., running on a server), in accordance with examples of the present discloser. At step 358, the web application 302 sends a request for updating dispensing mode, to the host application server 158. At step 362, the update request of step 358 is successful. At step 360, the messaging server 156 sends a notification trigger for updating the dispensing mode, to the application 312. At step 364, the application 312 sends a request for updating dispensing mode, to the host application server 158. At step 366, the application 312 fetches data for updating the dispensing mode (e.g., mode of cash payment, credit system, debit system, user groups, prepaid modes, age restrictions, product restrictions, quantity restriction, allowance restrictions, product size restrictions) from the host application server 158.

Figure 3G:
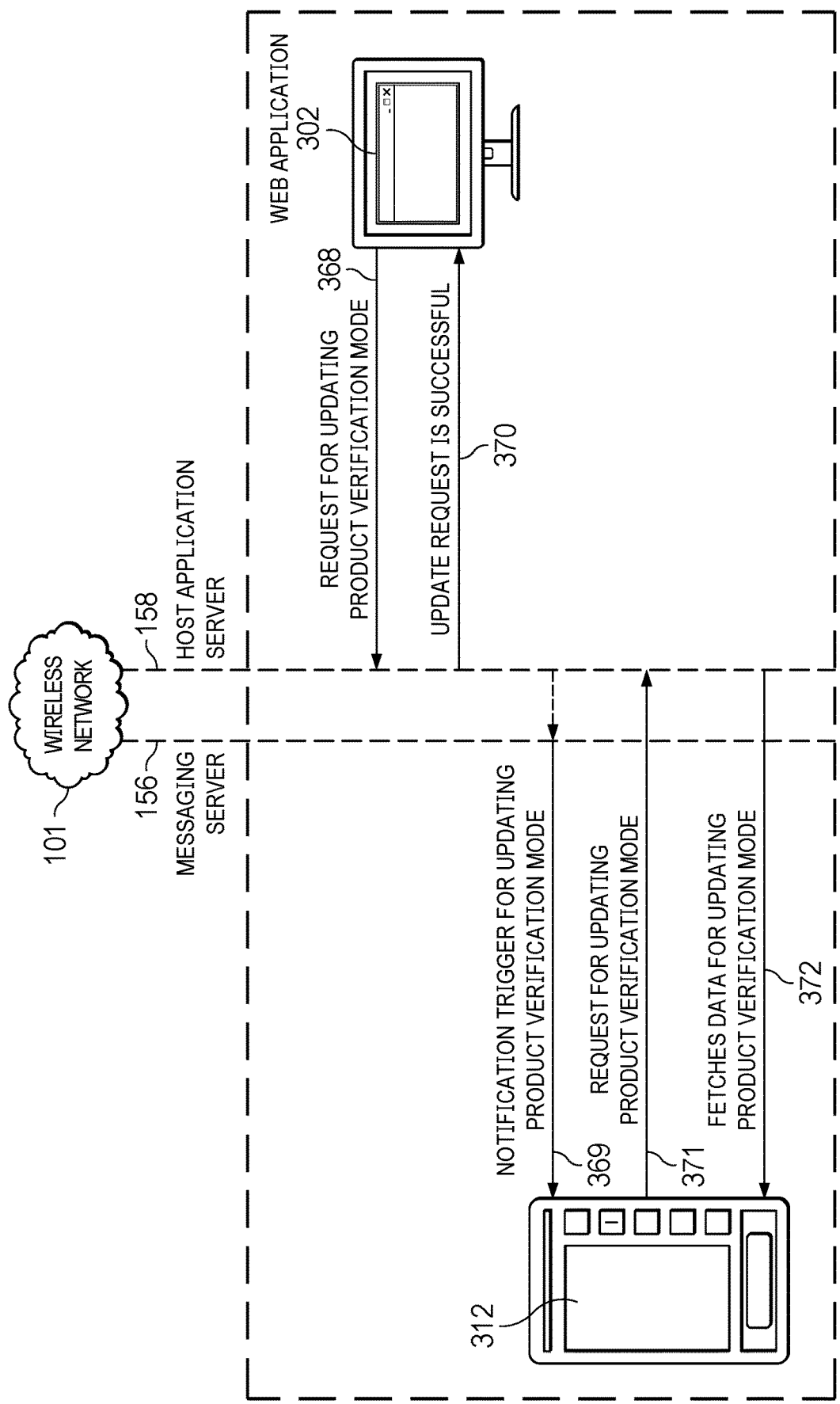

FIG. 3G illustrates communication between network 101, an application associated with the dispensing machine, a web application (e.g., running on a server), in accordance with examples of the present discloser. At step 368, the web application 302 sends a request for updating product verification mode, to the host application server 158. At step 370, the update request of step 368 is successful. At step 369, the messaging server 156 sends a notification trigger for updating the product verification mode, to the application 312. At step 371, the application 312 sends a request for updating product verification mode, to the host application server 158. At step 372, the application 312 fetches data for updating the product verification mode from the host application server 158.

Figure 3H:
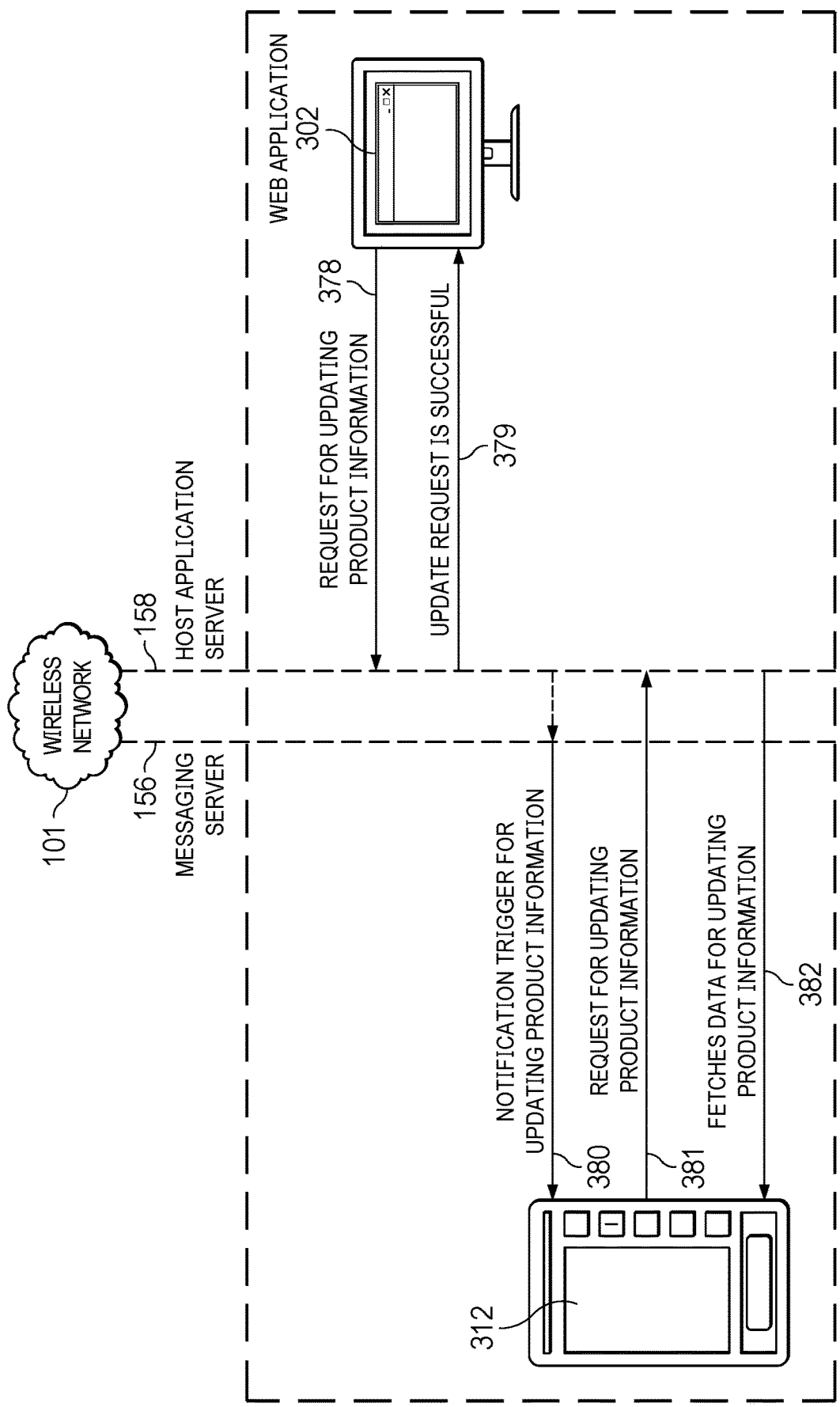

FIG. 3H illustrates communication between network 101, an application associated with the dispensing machine, a web application (e.g., running on a server), in accordance with examples of the present discloser. At step 378, the web application 302 sends a request for updating product information, to the host application server 158. At step 379, the update request of step 378 is successful. At step 380, the messaging server 156 sends a notification trigger for updating the product information, to the application 312. At step 381, the application 312 sends a request for updating product information, to the host application server 158. At step 382, the application 312 fetches data for updating the product information (e.g., manufacturing date, packaging ID, batch numbers, brand name, product name, product description details, product ID, product type, product image ID, product images, product dimensions, product weight, product shape, product expiry date, product contents, product ingredients, nutritional facts, allergen details, product quantity, and internal structure info including internal structure ID, name and image, product structure allocation ID, dimensions and product coordinates ID with position values in the dispensing machine) from host application server 158; updating the price of at least one product within a dispensing machine; updating the discounts of at least on product on the dispensing machine (e.g., reduced price, discount percentage, discount value, difference amount).

Figure 4:
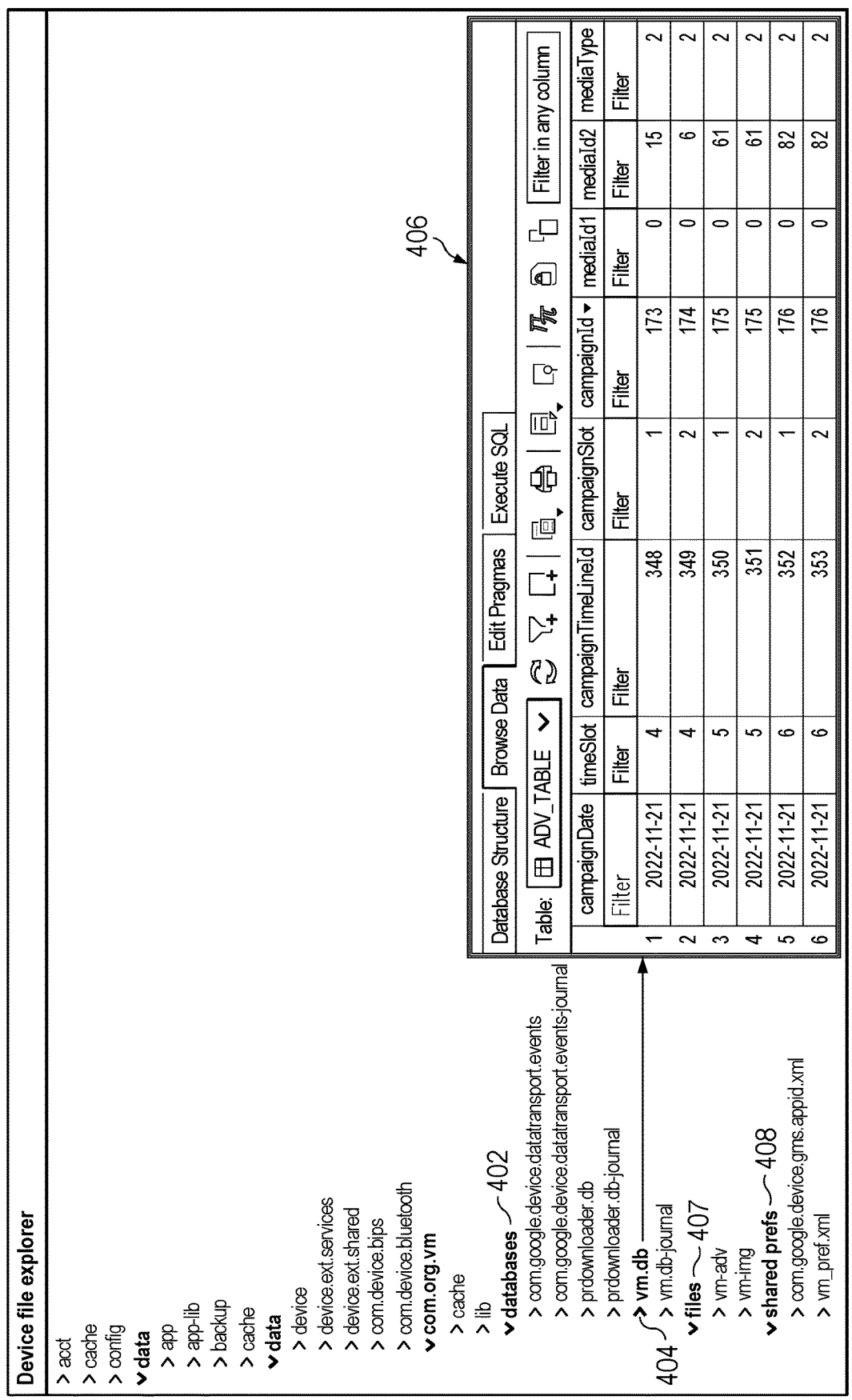
FIG. 4 illustrates a file structure for operating the dispensing machine/vending machine (VM) in accordance with examples of the present disclosure.

FIG. 4 illustrates a file structure 400 for operating the dispensing machine/vending machine (VM) in accordance with examples of the present disclosure. The file structure 400 includes databases 402 (that include a VM database 404), files 407 and shared preferences 408. The VM database 404 includes information 406 (advertisement info) that may include campaign date, time slot, campaign timeline ID, campaign slot, campaign ID, media file ID 1, media file ID 2, and media type.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A system comprising:
a messaging server connected to a wireless network;
a host application server connected to the wireless network, wherein the host application server and the messaging server are separately connected to the wireless network and are configured to communicate within the wireless network; and
a dispensing machine comprising:
at least one application running on the dispensing machine;
a display;
a microcontroller;
a microprocessor;
a wireless network module configured for data communication between the dispensing machine, the host application server, and the messaging server;
peripheral devices comprising a plurality of readers; and
a dispensing mechanism comprising a product collection area, motors, limit switches, and one or more sensors wherein the system is configured to send and receive data from the wireless network as follows:
a web application is configured to send preconfigured instructions to the host application server and thereby receive a response from the host application server, wherein the preconfigured instructions comprise operations parameters, configuration details, notification instructions, software updates, and/or diagnosis routines;
the host application server is configured to communicate with the message server;
after a response is received from the host application server, the messaging server is configured to send a notification trigger for the preconfigured instructions from the host application server to the at least one application associated with the dispensing machine;
the at least one application associated with the dispensing machine is configured to send a request to the host application server for preconfigured instructions, wherein the at least one application is configured to receive the preconfigured instructions from the host application server;
the display of the dispensing machine is operable based on one or more signals from the host applications server;
the dispensing machine is operable to convert the preconfigured instructions in a form of one or more signals into pulses for operating the dispensing mechanism, wherein the pulses are preconfigured pulses stored in the microprocessor of the dispensing machine to operate at least one motor of the dispensing mechanism; and
the at least one application on the dispensing machine sends data to the host application server via the wireless network, wherein the at least one application is configured to monitor the data sent from the dispensing machine.

2. The system of claim 1, wherein the dispensing machine is further configured to transmit microprocessor logs.

3. The system of claim 2, wherein the dispensing machine is further configured to transmit user access logs.

4. The system of claim 3, wherein the dispensing machine is further configured to transmit sensor logs.

5. The system of claim 4, wherein the dispensing machine is further configured to transmit display and networking logs.

6. The system of claim 5, wherein the dispensing machine is further configured to transmit user input logs.

7. The system of claim 6, wherein the dispensing machine is further configured to transmit sales logs.

8. The system of claim 7, wherein the dispensing machine is further configured to transmit error logs.

9. The system of claim 1, wherein the dispensing machine includes a vending machine.

10. The system of claim 1, wherein the dispensing machine includes at least one reader.

11. The system of claim 1, wherein the dispensing machine is further configured to transmit microcontroller logs.

12. The system of claim 1, wherein the dispensing machine further comprises local storage that includes media files, preference values, and other data.

13. The system of claim 1, wherein the dispensing machine is configured to be troubleshooted remotely via the wireless network by sharing at least one error code of the microcontroller associated with a dispense failure, system malfunction, or machine breakdown.

14. The system of claim 13, wherein the sharing the at least one error code comprises sending a push notification from the dispensing machine via either an API call or through a wireless connection to an application via the wireless network.

15. The system of claim 1, wherein the display is further configured to show a product expiry date, nutritional facts, product ingredients, and allergen details associated with a selected product.

16. The system of claim 1, wherein the product selection shown on the display is updated over the wireless network using the pre-configured instructions.

17. The system of claim 1, further comprising a lockable door to access the products, wherein the lockable door is remotely unlocked over the wireless network when the dispensing machine is presented with a computer-readable authorized personnel identifier based on updated instructions saved to one or more microprocessors of the dispensing machine.

* * * * *